United States Patent
Bae et al.

(10) Patent No.: US 12,434,323 B2
(45) Date of Patent: Oct. 7, 2025

(54) ULTRASONIC WELDING DEVICE AND WELDING METHOD FOR SECONDARY BATTERY

(71) Applicant: LG Energy Solution, Ltd., Seoul (KR)

(72) Inventors: Sang Ho Bae, Daejeon (KR); Hun Bum Jung, Daejeon (KR); Jin Yong Lee, Daejeon (KR); Ji Hun Hwang, Daejeon (KR); Cha Hun Ku, Daejeon (KR); Su Taek Jung, Daejeon (KR); Chang Min Han, Daejeon (KR); Jae Hwa Choi, Daejeon (KR); Young Seok Baek, Daejeon (KR); Jeong Yeon Kim, Daejeon (KR); Jung Joo Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 248 days.

(21) Appl. No.: 17/921,270

(22) PCT Filed: Jun. 25, 2021

(86) PCT No.: PCT/KR2021/008045
§ 371 (c)(1),
(2) Date: Oct. 25, 2022

(87) PCT Pub. No.: WO2022/019504
PCT Pub. Date: Jan. 27, 2022

(65) Prior Publication Data
US 2023/0201953 A1     Jun. 29, 2023

(30) Foreign Application Priority Data
Jul. 20, 2020   (KR) .................... 10-2020-0089914

(51) Int. Cl.
*B23K 20/00*   (2006.01)
*B23K 20/10*   (2006.01)
*B23K 101/36*  (2006.01)

(52) U.S. Cl.
CPC ............ *B23K 20/10* (2013.01); *B23K 20/002* (2013.01); *B23K 2101/36* (2018.08)

(58) Field of Classification Search
CPC ..... B23K 20/10; B23K 20/106; H01M 4/139; G01B 5/06
See application file for complete search history.

(56) References Cited

U.S. PATENT DOCUMENTS

2006/0169388 A1   8/2006   Shimizu et al.
2009/0061151 A1   3/2009   LaFond et al.
(Continued)

FOREIGN PATENT DOCUMENTS

CN   205333039 U   6/2016
CN   108413914 A   8/2018
(Continued)

OTHER PUBLICATIONS

CN108475756A computer english translation (Year: 2024).*
(Continued)

*Primary Examiner* — Erin B Saad
(74) *Attorney, Agent, or Firm* — Lerner David LLP

(57) ABSTRACT

An ultrasonic welding device for a secondary battery is provided. The ultrasonic welding device is configured to weld an overlapping surface of an electrode tab and an electrode lead in an electrode assembly. The ultrasonic welding device includes an anvil on which the overlapping surface of the electrode tab and the electrode lead are disposed. A horn is configured to apply ultrasonic waves to the overlapping surface of the electrode tab and the electrode lead while pressing the overlapping surface. The overlap- (Continued)

ping surface is disposed on the anvil. An electrode tab measuring part is configured to measure a thickness of the electrode tab disposed on the overlapping surface. A pressure adjusting device is configured to adjust a pressure applied to the overlapping surface by the anvil and the horn according to the thickness value of the electrode tab. The thickness value is measured by the electrode tab measuring part.

11 Claims, 5 Drawing Sheets

(56) References Cited

U.S. PATENT DOCUMENTS

| | | | |
|---|---|---|---|
| 2010/0323148 | A1 | 12/2010 | LaFond et al. |
| 2016/0288246 | A1 | 10/2016 | Ichinose et al. |
| 2019/0321945 | A1 | 10/2019 | Jung et al. |
| 2019/0381741 | A1 | 12/2019 | Savitski et al. |

FOREIGN PATENT DOCUMENTS

| | | | |
|---|---|---|---|
| EP | 0208310 | B1 | 1/1990 |
| JP | H09330706 | A | 12/1997 |
| JP | 3603564 | B2 | 12/2004 |
| JP | 2008110382 | A | 5/2008 |
| JP | 6166052 | B2 | 7/2017 |
| JP | 6624986 | B2 | 12/2019 |
| KR | 20060087419 | A | 8/2006 |
| KR | 20100061695 | A | 6/2010 |
| KR | 20150097982 | A | 8/2015 |
| KR | 20170046910 | A | 5/2017 |
| KR | 20180120910 | A | 11/2018 |
| KR | 20190058713 | A | 5/2019 |
| KR | 20190079580 | A | 7/2019 |
| KR | 102006806 | B1 | 8/2019 |
| KR | 102072853 | B1 | 2/2020 |
| KR | 102090787 | B1 | 3/2020 |
| KR | 20200066901 | A | 6/2020 |

OTHER PUBLICATIONS

JP 2009022977 computer english translation (Year: 2024).*
EP 0208310 A1 computer english translation (Year: 2024).*
Extended European Search Report including Written Opinion for Application No. 21845372.8 dated Jan. 2, 2024, pp. 1-8.
Search Report dated Jun. 27, 2024 from the Office Action for Chinese Application No. 202180029547.2, Issued Jun. 28, 2024, pp. 1-2. [See p. 1, categorizing the cited references].
International Search Report for Application No. PCT/KR2021/008045 mailed Sep. 29, 2021, pp. 1-3.

* cited by examiner

ULTRASONIC WELDING DEVICE AND WELDING METHOD FOR SECONDARY BATTERY

CROSS-REFERENCE TO RELATED APPLICATION

The present application is a national phase entry under 35 U.S.C. § 371 of International Application No. PCT/KR2021/008045 filed on Jun. 25, 2021, which claims priority from Korean Patent Application No. 10-2020-0089914, filed on Jul. 20, 2020, the disclosures of which are hereby incorporated by reference in their entirety.

TECHNICAL FIELD

The present invention relates to an ultrasonic welding device and method for a secondary battery, and more particularly, to an ultrasonic welding device and method for a secondary battery, in which pressing force of an anvil and a horn is adjustable.

BACKGROUND ART

In general, secondary batteries refer to chargeable and dischargeable batteries, unlike primary batteries that are not chargeable. Such a secondary battery is being widely used in the high-tech electronic fields such as mobile phones, notebook computers, and camcorders.

Such a secondary battery is classified into a can type secondary battery in which an electrode assembly is built in a metal can and a pouch type secondary battery in which an electrode assembly is built in a pouch. The pouch type secondary battery comprises an electrode assembly provided with an electrode tab, an electrode lead coupled to the electrode tab, and a pouch accommodating the electrode assembly in a state in which a front end of the electrode lead is withdrawn to the outside.

Here, the electrode tab and the electrode lead are coupled to each other using an ultrasonic welding device for a secondary battery. That is, the ultrasonic welding device for the secondary battery according to the related art comprises an anvil, on which an overlapping surface of an electrode tab and an electrode lead is disposed, and a horn for applying ultrasonic waves to the overlapping surface disposed on the anvil to weld the overlapping surface.

However, in the ultrasonic welding device for the secondary battery according to the related art, when the overlapping surface is pressed over a set pressure through the anvil and the horn, the overlapping surface is deformed to cause product defects, in particular, causing welding defects due to the deformation of the overlapping surface.

DISCLOSURE OF THE INVENTION

Technical Problem

An ultrasonic welding device and welding method for a secondary battery according to the present invention for solving the above problems may adjust pressing force of an anvil and a horn that press an overlapping surface of an electrode tab and an electrode lead to press the overlapping surface with a constant pressure through the anvil and the horn and thus prevent the overlapping surface from being deformed, thereby preventing product defects and welding defects from occurring.

Technical Solution

An ultrasonic welding device for a secondary battery, which is configured to weld an overlapping surface of an electrode tab and an electrode lead, which are provided in an electrode assembly, according to the present invention for achieving the above object comprises: an anvil on which the overlapping surface of the electrode tab and the electrode lead is disposed; a horn configured to apply ultrasonic waves to the overlapping surface of the electrode tab and the electrode lead, which is disposed on the anvil, while pressing the overlapping surface; an electrode tab measuring part configured to measure a thickness of the electrode tab disposed on the overlapping surface; and a pressure adjusting device configured to adjust a pressure applied to the overlapping surface by the anvil and the horn according to the thickness value of the electrode tab, which is measured by the electrode tab measuring part.

The pressure adjusting device may comprise a horn pressure adjusting part, which is configured to allow pressing force of the horn, which is applied to the overlapping surface, to increase or decrease according to the thickness value of the electrode tab, which is measured by the electrode tab measuring part, thereby adjusting the pressure applied to the overlapping surface by the anvil and the horn.

The horn pressure adjusting part may compare: a horn control piece configured to calculate a pressure value of the horn by comparing the thickness value measured by the electrode tab measuring part to a predetermined set thickness reference value of the electrode tab; and a horn pressure adjusting piece configured to allow the pressing force of the horn, which is applied to the overlapping surface, to increase or decrease according to the pressure value of the horn, which is calculated by the horn control piece.

The horn pressure adjusting piece may be configured to allow the horn to ascend or descend in a direction of the overlapping surface so as to adjust the pressure of the horn through a distance between the overlapping surface and the horn.

Three or more electrode tab measuring parts may be installed on the electrode tab disposed on the overlapping surface to measure thicknesses at three or more places, and the horn control piece may be configured to set an average of the three or more thickness values of the electrode tabs, which are measured by the electrode tab measuring parts as the thickness value of the electrode tab.

The ultrasonic welding device may further comprise an electrode lead measuring part configured to measure a thickness of the electrode lead disposed on the overlapping surface, wherein the horn pressure adjusting part may be configured to allow the pressing force of the horn, which is applied to the overlapping surface, to increase or decrease according to the thickness value of the electrode lead, which is measured by the electrode lead measuring part, thereby adjusting the pressure, which is applied to the overlapping surface by the anvil and the horn, again.

The pressure adjusting device may comprise an anvil pressure adjusting part, which is configured to allow pressing force of the anvil, which is applied to the overlapping surface, to increase or decrease according to the thickness value of the electrode tab, which is measured by the electrode tab measuring part, thereby adjusting the pressure applied to the overlapping surface by the anvil and the horn.

The anvil pressure adjusting part may comprise: an anvil control piece configured to calculate a pressure value of the anvil by comparing the thickness value, which is measured by the electrode tab measuring part, to a predetermined set thickness reference value of the electrode tab; and an anvil pressure adjusting piece configured to allow the pressing force of the anvil, which is applied to the overlapping surface, to increase or decrease according to the pressure value of the anvil, which is calculated by the anvil control piece.

The anvil pressure adjusting piece may be configured to allow the horn to ascend or descend in a direction of the overlapping surface so as to adjust the pressure of the anvil through a distance between the overlapping surface and the anvil.

The ultrasonic welding device may further comprise a height adjusting part configured to constantly maintain a height of the overlapping surface disposed between the anvil and the horn.

The ultrasonic welding device may further comprise a disposing member disposed in a state in which the electrode tab and the electrode lead, which are provided in the electrode assembly, overlap each other.

An ultrasonic welding method for a secondary battery, which is performed to weld an overlapping surface of an electrode tab and an electrode lead, which are provided in an electrode assembly, according to the present invention comprises: a disposing process of disposing the overlapping surface of the electrode tab and the electrode lead, which are provided in the electrode assembly, between a horn and an anvil and disposing the overlapping surface on a top surface of the anvil; an electrode tab measuring process of measuring a thickness of the electrode tab disposed on the overlapping surface; a pressure adjusting process of adjusting a pressure applied to the overlapping surface by the anvil and the horn according to the thickness value of the electrode tab, which is measured in the electrode tab measuring process; and a welding process of applying ultrasonic waves to the overlapping surface while pressing the overlapping surface through the horn and the anvil, which are adjusted in pressure.

In the pressure adjusting process, pressing force of the horn, which is applied to the overlapping surface, may increase or decrease according to the thickness value of the electrode tab, which is measured in the electrode tab measuring process, to adjust the pressure applied to the overlapping surface by the anvil and the horn.

In the pressure adjusting process, pressing force of the anvil, which is applied to the overlapping surface, may increase or decrease according to the thickness value of the electrode tab, which is measured in the electrode tab measuring process, to adjust the pressure applied to the overlapping surface by the anvil and the horn.

The ultrasonic welding method may further comprise a height adjusting process of adjusting a height of the overlapping surface to be constantly maintained, between the disposing process and the electrode tab measuring process.

Advantageous Effects

The ultrasonic welding device for the secondary battery according to the present invention may comprise the anvil, the horn, the electrode tab measuring part, and the pressure adjusting device. Therefore, the pressure applied to the overlapping surface may be constantly adjusted by the anvil and the horn according to the thickness value of the electrode tab, and thus, the overlapping surface may be uniformly welded to prevent the overlapping surface from being damaged and deformed.

In addition, in the ultrasonic welding device for the secondary battery according to the present invention, the pressure adjusting device may be configured to adjust the pressure applied to the overlapping surface through the anvil and the horn by allowing the pressing force of the horn to increase or decrease, thereby easily adjusting the pressure applied to the overlapping surface.

In addition, the ultrasonic welding device for the secondary battery according to the present invention may further comprise the electrode lead measuring part that measures the thickness of the electrode lead disposed on the overlapping surface. Therefore, the pressure applied to the overlapping surface may be adjusted again by the anvil and the horn in addition to the thickness of the electrode lead, thereby more accurately adjusting the pressure applied to the overlapping surface by the anvil and the horn.

In the ultrasonic welding device for the secondary battery according to the present invention, the pressure adjusting device may comprise the anvil pressure adjusting part to increase or decrease in pressing force of the anvil, which is applied to the overlapping surface, according to the thickness value of the electrode tab, thereby uniformly adjusting the pressure applied to the overlapping surface by the anvil and the horn.

In addition, in the ultrasonic welding device for the secondary battery according to the present invention, the pressure adjusting device may further comprise the height adjusting part for maintaining the constant height of the overlapping surface disposed between the anvil and the horn, thereby uniformly adjusting the pressure applied to the overlapping surface by the anvil and the horn.

MODE FOR CARRYING OUT THE INVENTION

Figure 1:
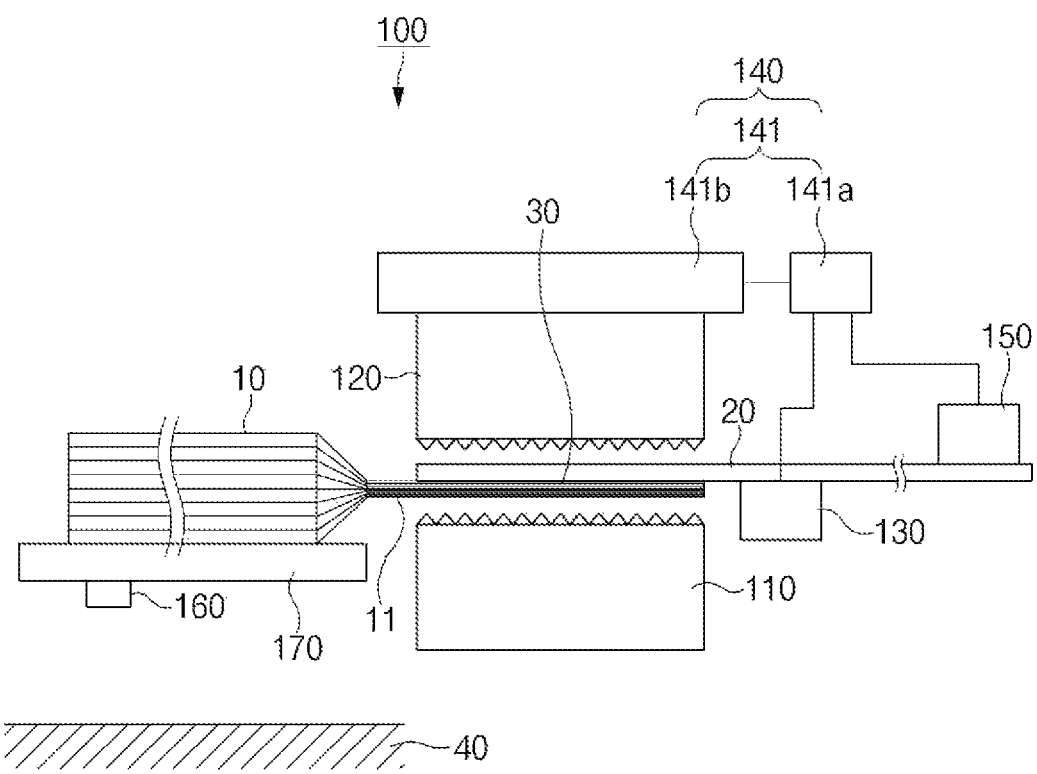
FIG. 1 is a schematic side view illustrating an ultrasonic welding device for a secondary battery according to a second embodiment of the present invention.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

[Secondary Battery According to First Embodiment of the Present Invention]

Referring to FIG. 1, a secondary battery according to a first embodiment according to the present invention comprises an electrode assembly 10 provided with an electrode tab 11 and an electrode lead 20 coupled to the electrode tab 11.

Here, the electrode tab 11 and the electrode lead 20 are disposed to partially overlap each other, and then, an overlapping surface of the electrode tab 11 and the electrode lead 20 is ultrasonic-welded through ultrasonic waves to bond the electrode tab 11 to the electrode lead 20. Here, the ultrasonic welding device for the secondary battery according to the first embodiment of the present invention is used.

[Ultrasonic Welding Device for Secondary Battery According to First Embodiment of the Present Invention]

As illustrated in FIG. 1, the ultrasonic welding device 100 for the secondary battery according to the first embodiment of the present invention comprises an anvil 110 on which an overlapping surface 30 of an electrode tab 11 and an electrode lead 20, which are provided in the electrode assembly 10, is disposed, and a horn 120 provided to weld the overlapping surface 30 of the electrode tab 11 and the electrode lead 20, which is disposed on the anvil 110.

Anvil

The anvil 110 is disposed below the overlapping surface 30, and the overlapping surface 30 is disposed so that the overlapping surface 30 is in close surface-contact with a top surface of the anvil 110. In addition, a plurality of unevennesses, each of which has a triangular pyramid shape, may be formed on the top surface of the anvil 110, and weldability of the overlapping surface 30 may be improved through the unevennesses.

The horn 120 is disposed above the overlapping surface 30 to irradiate ultrasonic waves in a state in which the overlapping surface 30 is pressed together with the anvil 110 to weld the overlapping surface 30. In addition, a plurality of unevennesses, each of which has a triangular pyramid shape, may be formed on a bottom surface of the anvil 120, and the weldability of the overlapping surface 30 may be improved through the unevennesses.

In the ultrasonic welding device 100 for the secondary battery, which has the above-described structure, according to the second embodiment of the present invention, in a state in which the anvil 110 and the horn 120 roll the overlapping surface 30 of the electrode tab 11 and the electrode lead 20, the overlapping surface 30 may be ultrasonic-welded through the horn 120 to couple the electrode tab 11 to the electrode lead 20.

In the ultrasonic welding device 100 for the secondary battery according to the first embodiment of the present invention, when the pressure applied to the overlapping surface 30 by the anvil 110 and the horn 120 is equal to or greater than a set value, the overlapping surface 30 may be stretched to cause damage and deformation, thereby causing welding defects.

In order to solve such a problem, the ultrasonic welding device 100 for the secondary battery according to the first embodiment of the present invention may allow the pressing force applied to the overlapping surface 30 to be constantly maintained by the anvil 110 and the horn 120, thereby preventing the overlapping surface from being damaged and deformed and also preventing welding defects.

That is, the ultrasonic welding device 100 for the secondary battery according to the first embodiment of the present invention may adjust a distance between the anvil 110 and the horn 120, which press the overlapping surface 30, to adjust the pressing force applied to the overlapping surface 30 by the anvil 110 and the horn 120, thereby preventing the welding defects of the overlapping surface 30 from occurring. That is to say, the horn 120 or the anvil 110 that presses the overlapping surface 30 may be adjusted in height to adjust the pressing force applied to the overlapping surface 30 by the anvil 110 and the horn 120.

For example, the ultrasonic welding device 100 for the secondary battery according to the first embodiment of the present invention comprises an electrode tab measuring part 130 and a pressure adjusting device 140.

Electrode Tab Measuring Part

The electrode tab measuring part 130 is disposed at a side of the overlapping surface 30 to measure a thickness of the electrode tab 11 disposed on the overlapping surface 30.

Here, three or more electrode tab measuring parts 130 are installed on the electrode tab 11 disposed on the overlapping surface 30 (both ends and a center in a longitudinal direction of the electrode tab) to measure thicknesses at three or more places.

Pressure Adjusting Device

The pressure adjusting device 140 adjusts a pressure applied to the overlapping surface 30 by the anvil 110 and the horn 120 according to a thickness value of the electrode tab 11, which is measured by the electrode tab measuring part 130.

For example, the pressure adjusting device 140 comprises a horn pressure adjusting part 141, which allows the pressing force of the horn 120, which is applied to the overlapping surface 30, to increase or decrease according to the thickness value of the electrode tab 11, which is measured by the electrode tab measuring part 130, thereby adjusting pressures applied to the overlapping surface 30 by the anvil 110 and the horn 120.

The horn pressure adjusting part 141 compares a horn control piece 141a, which calculates a pressure value of the horn 120 by comparing the thickness value, which is measured by the electrode tab measuring part 130, to a predetermined set thickness reference value of the electrode tab 11, and a horn pressure adjusting piece 141b, which allows the pressing force of the horn 120, which is applied to the overlapping surface 30, to increase or decrease according to the pressure value of the horn 120, which is calculated by the horn control piece 141a.

The horn control piece 141a may set an average of the three or more thickness values of the electrode tabs 11, which are measured by the electrode tab measuring parts 130 as the thickness value of the electrode tab 11, and thus, the entire thickness of the electrode tab 11 may be reflected more clearly.

In addition, the horn pressure adjusting piece 141b may allow the horn 120 to ascend or descend in a direction of the overlapping surface 30 in a state, in which a distance between the overlapping surface 30 and the horn 120 is set, to reset the distance between the overlapping surface 30 and the horn 120, thereby adjusting the pressure of the horn 120 through the distance between the overlapping surface 30 and the horn 120.

The horn pressure adjusting part 141 having the above-described structure may calculate the pressure value of the horn according to the thickness of the electrode tab 11 through the horn control piece 141a and also may allow the horn 120 to ascend or descend with respect to the overlapping surface 30 so as to correspond to the pressure value of the horn, which is calculated by the horn control piece 141a through the horn pressure adjusting piece 141b, thereby adjusting the distance between the overlapping surface 30 and the horn 120, resulting in adjusting the pressure applied to the overlapping surface 30 by the horn 120.

Thus, the ultrasonic welding device 100 for the secondary battery according to the first embodiment of the present invention may comprise the pressure adjusting device 140 provided with the horn pressure adjusting part 141, and thus, the pressing pressure applied to the overlapping surface by the anvil 110 and the horn 120 may be constantly maintained to prevent the overlapping surface 30 from being damaged or deformed, thereby preventing welding defects from occurring.

In the ultrasonic welding device 100 for the secondary battery according to the first embodiment of the present invention, a thickness of the electrode lead coupled to the electrode assembly may vary according to the use, and thus, the thickness of the electrode lead 20 may be reflected to adjust the pressing force applied to the overlapping surface 30 by the anvil 110 and the horn 120.

Electrode Lead Measuring Part

That is, the ultrasonic welding device 100 for the secondary battery according to the first embodiment of the present invention further comprises an electrode lead measuring part 150 that measure a thickness of the electrode lead 20 disposed on the overlapping surface 30. Thus, the horn pressure adjusting part 142b may allow the pressing force of the horn 120, which is applied to the overlapping surface 30, to increase or decrease according to the thickness value of the electrode lead 20, which is measured by the electrode lead measuring part 150, thereby adjusting the pressure, which is applied to the overlapping surface 30 by the anvil 110 and the horn 120, again.

The ultrasonic welding device 100 for the secondary battery, which has the above-described structure, according to the first embodiment of the present invention may reflect the thickness of the electrode lead together with the electrode tab to more constantly adjust the pressure applied to the overlapping surface 30.

The ultrasonic welding device 100 for the secondary battery according to the first embodiment of the present invention further comprises a height adjusting part 160 that constantly maintains a height of the overlapping surface disposed between the anvil and the horn.

Height Adjusting Part

The height adjusting part 160 measures the height of the overlapping surface 30 disposed between the anvil 110 and the horn 120 with respect to the ground 40 to adjust the height, thereby constantly maintaining the height of the overlapping surface 30 disposed between the anvil 110 and the horn 120. That is, the electrode assembly may ascend or descend to constantly maintain the height of the overlapping surface 30 disposed between the anvil 110 and the horn 120 on the overlapping surface 30 connected to the electrode assembly 10.

The ultrasonic welding device 100 for the secondary battery according to the first embodiment of the present invention further comprises a disposing member 170 on which the electrode assembly 10 is disposed.

Disposing Member

The electrode assembly 10 may be disposed on a top surface of the disposing member 170 so that the overlapping surface 30 of the electrode tab 11 and the electrode lead 20, which are provided in the electrode assembly 10, is stably disposed between the anvil 110 and the horn 120.

Therefore, the ultrasonic welding device 100 for the secondary battery according to the first embodiment of the present invention may adjust the pressing force applied to the overlapping surface by the anvil 110 and the horn 120 to prevent the welding defects from occurring in advance.

Hereinafter, an ultrasonic welding method for the secondary battery according to the first embodiment of the present invention will be described.

[Ultrasonic Welding Method for Secondary Battery According to First Embodiment of the Present Invention]

Figure 2:
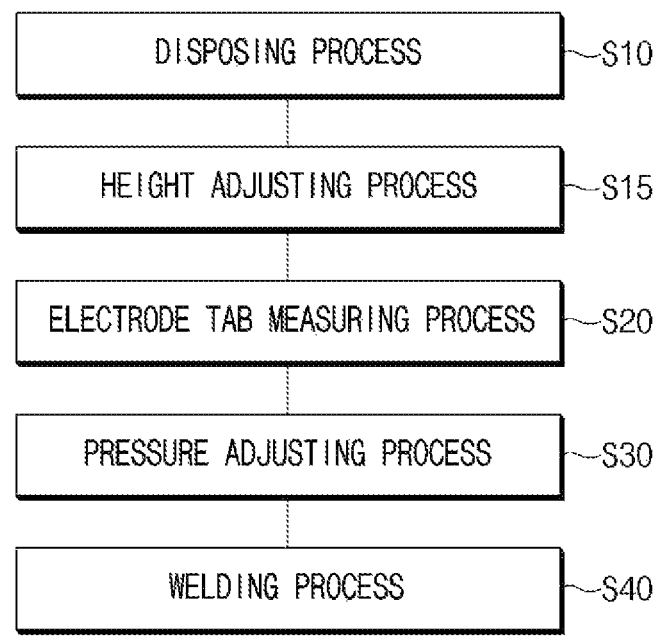
FIG. 2 is a flowchart illustrating an ultrasonic welding method for the secondary battery according to the first embodiment of the present invention.

As illustrated in FIG. 2, an ultrasonic welding method for the secondary battery according to the first embodiment of the present invention is performed to weld an overlapping surface of an electrode tab and an electrode lead, which are provided in an electrode assembly, and comprises a disposing process (S10), a height adjusting process (S25), an electrode tab measuring process (S20), a pressure adjusting process (s30), and a welding process (S40).

Disposing Process

In the disposing process (S10), an electrode assembly 10 is disposed on a top surface of a disposing member 170. Then, an overlapping surface 30 of an electrode tab 11 and an electrode lead 20, which are provided in the electrode assembly 10, is disposed between an anvil 110 and a horn 120, and then the overlapping surface 30 is disposed to be in close contact with a top surface of the anvil 110.

Height Adjusting Process

In the height adjusting process (S15), a height of the overlapping surface 30 disposed on the anvil 110 and the horn 120 is measured through the height adjusting part 160, and then, the measured value and an input reference value are compared to each other. Here, when the comparison value is within a set range, it is determined as being normal, and when the comparison value is out of the set range, the height of the overlapping surface 30 is adjusted by a difference value. Thus, the height of the overlapping surface 30 disposed on the anvil 110 and the horn 120 may be adjusted to be maintained at a constant height.

Electrode Tab Measuring Process;

In the electrode tab measuring process (S20), a thickness of the electrode tab 11 disposed on the overlapping surface 30 is measured through the electrode tab measuring part 130. Here, the electrode tab measuring part 130 measures thicknesses of the electrode tab 11 disposed on the overlapping surface 30 at three or more places.

Pressure Adjusting Process

In the pressure adjusting process (S30), a pressure applied to the overlapping surface 30 by the anvil 110 and the horn 120 is adjusted through the pressure adjusting device 140 according to the thickness value of the electrode tab 11, which is measured in the electrode tab measuring process (S20).

That is, the pressure adjusting device 140 allows the pressing force of the horn 120, which is applied to the overlapping surface 30, to increase or decrease according to the thickness value of the electrode tab 11, which is measured in the electrode tab measuring process (S20), through the horn pressure adjusting part 141, thereby adjusting the pressure applied to the overlapping surface 30 by the anvil 110 and the horn 120. Here, the horn pressure adjusting part 141 adjusts the pressing force of the horn 120 in comparison with the average value of the thicknesses of the electrode tab 11, which are measured at the three or more places by the electrode tab measuring part 130.

Welding Process

In the welding process, ultrasonic waves are applied in a state, in which the overlapping surface 30 is pressed through the horn 120 and the anvil 110 of which the pressure is adjusted, to perform welding.

When the above-described processes are completed, the electrode assembly, in which the electrode tab and the electrode lead are uniformly welded, may be manufactured.

Hereinafter, in descriptions of another embodiment of the present invention, constituents having the same function as the above-mentioned embodiment have been given the same reference numeral in the drawings, and thus duplicated description will be omitted.

[Ultrasonic Welding Device for Secondary Battery According to Second Embodiment of the Present Invention]

Figure 3:
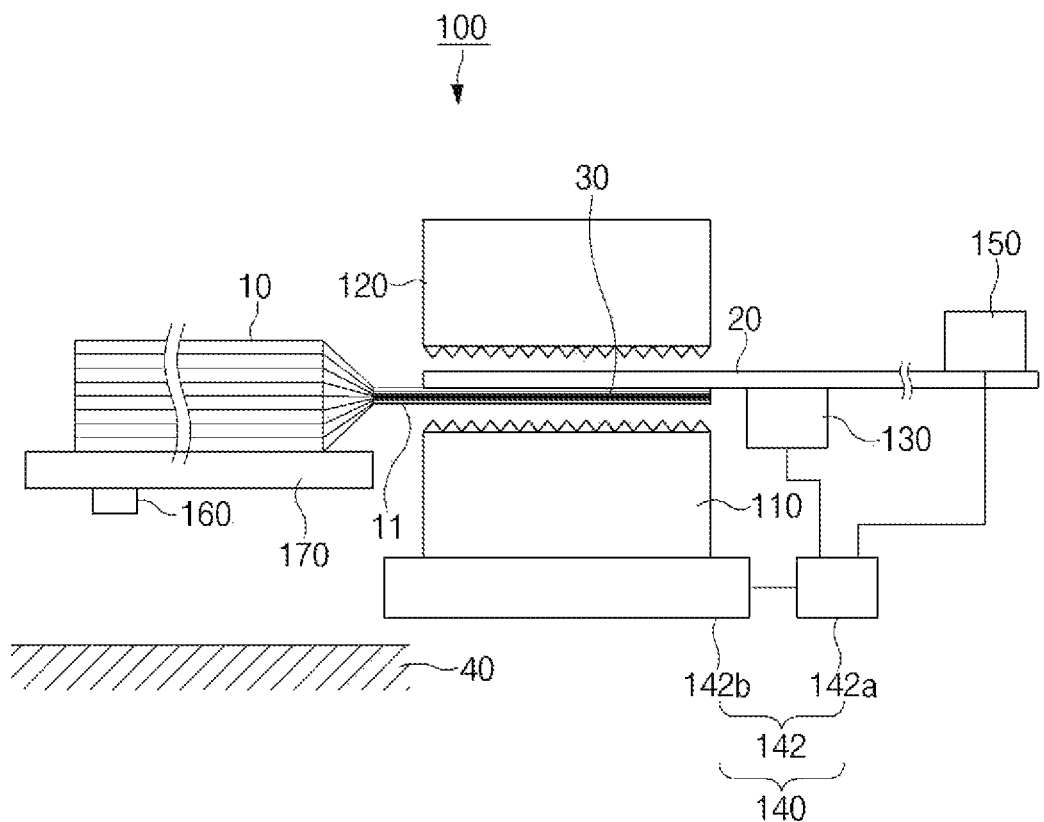
FIG. 3 is a schematic side view illustrating an ultrasonic welding device for a secondary battery according to a second embodiment of the present invention.

As illustrated in FIG. 3, an ultrasonic welding device 100 for a secondary battery according to a second embodiment of the present invention comprises an anvil 110 on which an overlapping surface of an electrode tab 11 and an electrode lead 20, which are provided in an electrode assembly 10, is disposed, a horn 120 that welds the overlapping surface 30 of the electrode tab 11 and the electrode lead 20, which is disposed on the anvil 110, an electrode tab measuring part 130 that measures a thickness of the electrode tab 11 disposed on the overlapping surface 30, and a pressure adjusting device 140 that adjusts a pressure applied to the overlapping surface 30 by the anvil 110 and the horn 120 according to the thickness value of the electrode tab 11, which is measured by the electrode tab measuring part 130.

The anvil 110, the horn 120, and the electrode tab measuring part 130 have the same configuration and function as the anvil, the horn, and the electrode tab measuring part, which are described above, and thus duplicated descriptions will be omitted.

Here, the pressure adjusting device 140 comprises an anvil pressure adjusting part 142, which allows the pressing force of the anvil 110, which is applied to the overlapping surface 30, to increase or decrease according to the thickness value of the electrode tab 11, which is measured by the electrode tab measuring part 130, thereby adjusting pressures applied to the overlapping surface 30 by the anvil 110 and the horn 120.

The anvil pressure adjusting part 142 comprises an anvil control piece 142a, which calculates a pressure value of the anvil 110 by comparing the thickness value, which is measured by the electrode tab measuring part 130, to a predetermined set thickness reference value of the electrode tab 11, and an anvil pressure adjusting piece 141b, which allows the pressing force of the anvil 110, which is applied to the overlapping surface 30, to increase or decrease according to the pressure value of the anvil 110, which is calculated by the anvil control piece 142a.

The anvil pressure adjusting piece 142b may adjust the pressure of the anvil through a distance between the overlapping surface and the anvil by allowing the anvil 110 to ascend or descend in the direction of the overlapping surface 30.

Thus, the ultrasonic welding device 100 for the secondary battery according to the second embodiment of the present invention may comprise the pressure adjusting device 140 provided with the anvil pressure adjusting part 142, and thus, the pressing pressure applied to the overlapping surface by the anvil 110 and the horn 120 may be constantly maintained to prevent the overlapping surface 30 from being damaged or deformed, thereby preventing welding defects from occurring.

Hereinafter, an ultrasonic welding method for a secondary battery according to the second embodiment of the present invention will be described.

[Ultrasonic Welding Method for Secondary Battery According to Second Embodiment of the Present Invention]

An ultrasonic welding method for the secondary battery according to the second embodiment of the present invention is performed to weld an overlapping surface of an electrode tab and an electrode lead, which are provided in an electrode assembly, and comprises a disposing process (S10), a height adjusting process (S25), an electrode tab measuring process (S20), a pressure adjusting process (s30), and a welding process (S40).

Here, the disposing process (S10), the height adjusting process (S25), the electrode tab measuring process (S20), and the welding process (S40) are the same as the disposing process (S10), the height adjusting process (S25), and the electrode tab measuring process (S20), which are described above, and thus duplicated descriptions will be omitted.

In the pressure adjusting process (S30), a pressure applied to an overlapping surface by an anvil and a horn is adjusted according to a thickness value of an electrode tab, which is measured in the electrode tab measuring process (S30), through an anvil pressure adjusting part 42.

That is, in the pressure adjusting process (S30), pressing force of the anvil, which is applied to the overlapping surface, may increase or decrease according to the thickness value of the electrode tab, which is measured in the electrode tab measuring process, to adjust pressures applied to the overlapping surface by the anvil and the horn.

EXPERIMENTAL EXAMPLE

Experiment Preparation

An overlapping surface of an electrode tab and an electrode lead, which are provided in Preparation Examples 1 to 5, is welded using the ultrasonic device 100 for the secondary battery according to the first embodiment of the present invention. Here, a thickness of the electrode tab disposed on the overlapping surface is 0.5 mm, and a thickness of the electrode lead disposed on the overlapping surface is 0.2 mm. Thus, a thickness of the overlapping surface is 0.7 mm.

Particularly, referring to the thickness of the overlapping surface, a gap between an anvil and a horn is changed in a unit of 0.05 mm, and then the overlapping surface of an electrode tab and an electrode lead, which are provided in Preparation Examples 1 to 5, is welded.

In Preparation Example 1, the overlapping surface of the electrode tab and the electrode lead is welded in a state in which the gap between the anvil and the horn is spaced by a distance of 0.6 mm that is less than the thickness of the overlapping surface, and at this time, pressing force is measured.

In Preparation Example 2, the overlapping surface of the electrode tab and the electrode lead is welded in a state in which the gap between the anvil and the horn is spaced by a distance of 0.65 mm that is less than the thickness of the overlapping surface, and at this time, pressing force is measured.

In Preparation Example 3, the overlapping surface of the electrode tab and the electrode lead is welded in a state in which the gap between the anvil and the horn is spaced by a distance of 0.7 mm that is equal to the thickness of the overlapping surface, and at this time, pressing force is measured.

In Preparation Example 4, the overlapping surface of the electrode tab and the electrode lead is welded in a state in which the gap between the anvil and the horn is spaced by a distance of 0.75 mm that is greater than the thickness of the overlapping surface, and at this time, pressing force is measured.

In Preparation Example 5, the overlapping surface of the electrode tab and the electrode lead is welded in a state in which the gap between the anvil and the horn is spaced by a distance of 0.8 mm that is greater than the thickness of the overlapping surface, and at this time, pressing force is measured.

Here, the electrode tab comprises a negative electrode tab and a positive electrode tab, and the electrode lead comprises a negative electrode lead and a positive electrode lead. That is, a negative electrode tab and a negative electrode lead are welded for 0.36 seconds, and at this time, an amplitude is 41%. A positive electrode tab and a positive electrode lead are welded for 0.17 seconds, and at this time, an amplitude is 37%.

Tensile Strength Test

Figure 4:
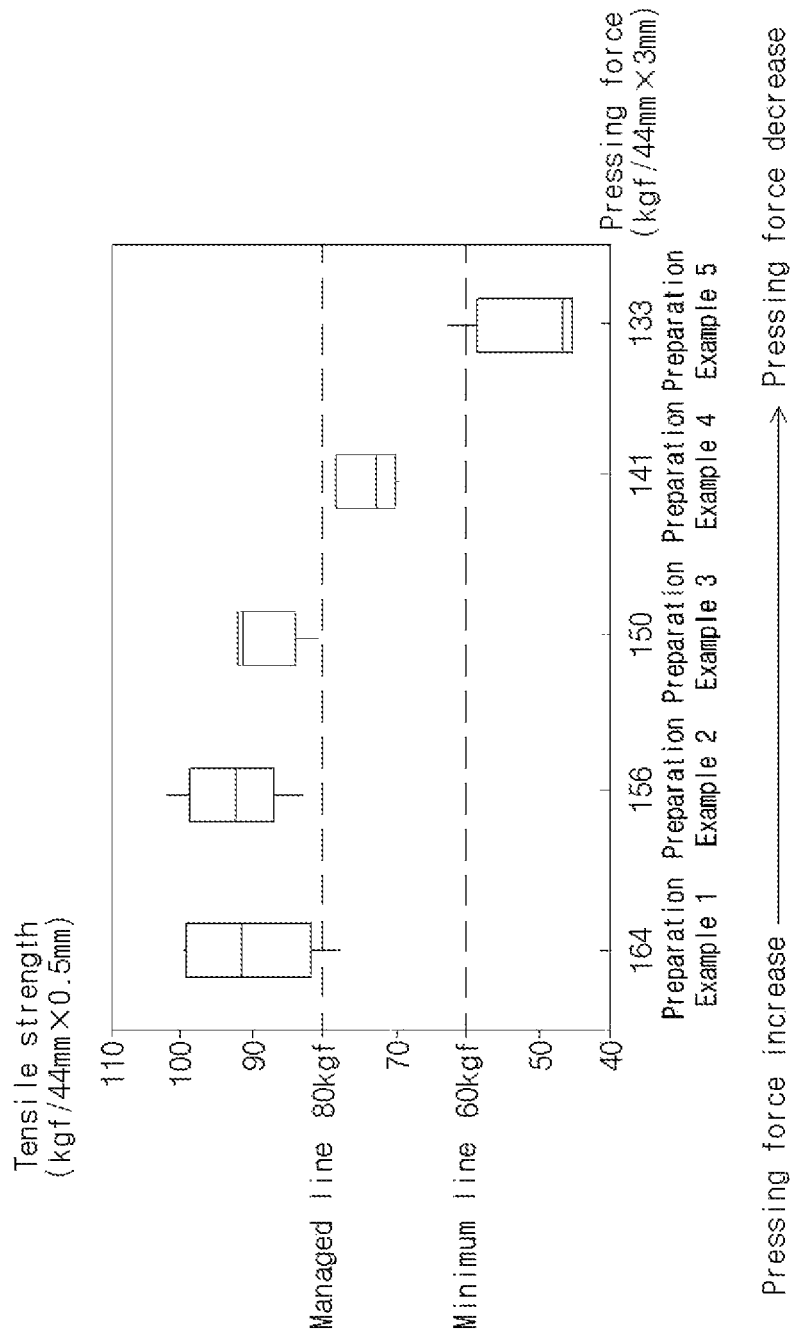
FIG. 4 is a graph illustrating results obtained by measuring tensile strengths of a negative electrode tab and a negative electrode lead, which are welded by the ultrasonic welding device for the secondary battery according to the first embodiment of the present invention.

As the result of measuring the tensile strength of the overlapping surface of the negative electrode tab and the negative electrode lead, which are welded in Preparation Examples 1 to 5, a graph as shown in FIG. 4 may be obtained.

Figure 5:
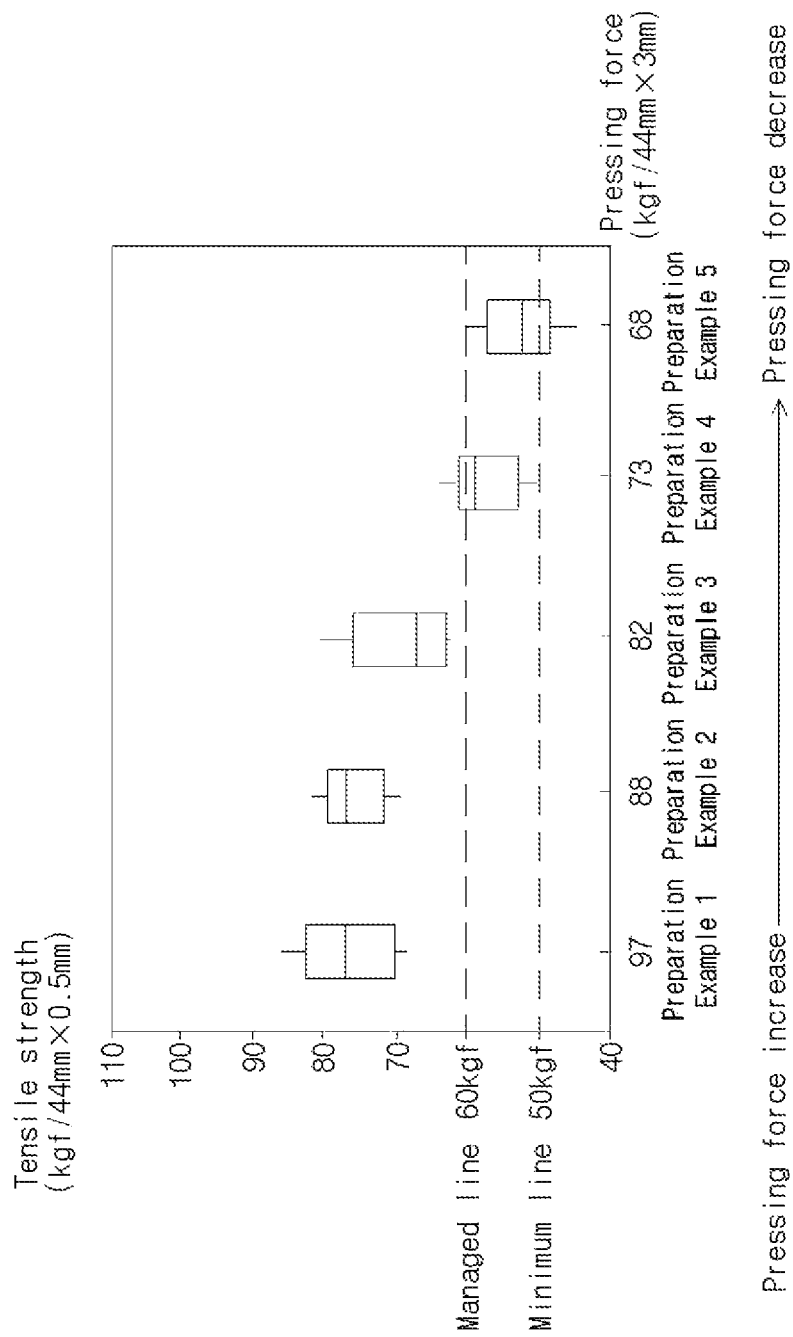
FIG. 5 is a graph illustrating results obtained by measuring tensile strengths of a positive electrode tab and a positive electrode lead, which are welded by the ultrasonic welding device for the secondary battery according to the first embodiment of the present invention.

As the result of measuring the tensile strength of a welding part formed on the overlapping surface of the positive electrode tab and the positive electrode lead, which are welded in Preparation Examples 1 to 5, a graph as shown in FIG. 5 may be obtained.

Here, managed tensile strength of the negative electrode is set to 80 kgf. Also, managed tensile strength of the positive electrode is set to 60 kgf. Here, tensile strength of 80 kgf corresponds to pressing force of 150 kgf, and tensile strength of 60 kgf corresponds to pressing force of 75 kgf. Also, the welding part has a length of 44 mm, a width of 3 mm, and a thickness of 0.5 mm.

Test Result of Pressing Force Through Tensile Strength

As the result of the test result of the overlapping surface of the welded negative electrode tab and negative electrode lead, referring to FIG. 4, in Preparation Examples 1 to 3, it is seen that, since the measured tensile strength is greater than managed tensile strength, the welding is normal. That is, it is seen that, since the pressing force in Preparation Example 1 is measured to 164 kgf, the pressing force in Preparation Example 2 is measured to 156 kgf, and the pressing force in Preparation Example 3 is measured to 150 kgf, and thus, the pressing force is equal to or greater than 150 kgf that is the managed pressing process, the welding is normal. In addition, in Preparation Examples 4 and 5, it is seen that, since the measured pressing force is equal to or less than the managed tensile strength, the pressing force has to be adjusted, or the welding is defective. That is, it is seen that, since the pressing force in Preparation Example 4 is measured to 141 kgf, and the pressing force in Preparation Example 5 is measured to 133 kgf, and thus the measured pressing force is less than 150 kgf that is the managed pressing force, the pressing force has to be adjusted, or the welding is defective.

As the result of the test result of the overlapping surface of the welded positive electrode tab and positive electrode lead, referring to FIG. 5, in Preparation Examples 1 to 3, it is seen that, since the measured tensile strength is greater than managed tensile strength, the welding is normal. That is, it is seen that, since the pressing force in Preparation Example 1 is measured to 97 kgf, the pressing force in Preparation Example 2 is measured to 88 kgf, and the pressing force in Preparation Example 3 is measured to 82 kgf, and thus, the pressing force is equal to or greater than 75 kgf that is the managed pressing process, the welding is normal. In addition, in Preparation Examples 4 and 5, it is seen that, since the measured pressing force is equal to or less than the managed tensile strength, the pressing force has to be adjusted, or the welding is defective. That is, it is seen that, since the pressing force in Preparation Example 4 is measured to 73 kgf, and the pressing force in Preparation Example 5 is measured to 68 kgf, and thus the measured pressing force is less than 75 kgf that is the managed pressing force, the pressing force has to be adjusted, or the welding is defective.

Therefore, as the result of measuring the tensile strength in Preparation Examples 1 to 5, the gap between the anvil and the horn may be adjusted to prevent the welding defects of the electrode tab and the electrode lead, which are welded by the anvil and the horn, from occurring.

Accordingly, the scope of the present invention is defined by the appended claims more than the foregoing description and the exemplary embodiments described therein.

Various modifications made within the meaning of an equivalent of the claims of the invention and within the claims are to be regarded to be in the scope of the present invention.

DESCRIPTION OF THE REFERENCE NUMERALS

100: Ultrasonic welding device for secondary battery
110: Anvil
120: Horn
130: Electrode tab measuring part
140: Pressure adjusting device
141: Horn pressure adjusting part
141a: Horn control piece
141b: Horn pressure adjusting piece
142: Anvil pressure adjusting part
150: Electrode lead measuring part
160: Height adjusting part

The invention claimed is:

1. An ultrasonic welding device for a secondary battery, the ultrasonic welding device configured to weld an overlapping surface of an electrode tab and an electrode lead in an electrode assembly, the ultrasonic welding device comprising:
   an anvil, wherein the overlapping surface of the electrode tab and the electrode lead is disposed on the anvil;
   a horn configured to apply ultrasonic waves to the overlapping surface of the electrode tab and the electrode lead while pressing the overlapping surface;
   an electrode tab measuring part configured to measure an entire thickness of the electrode tab disposed on the overlapping surface; and
   a pressure adjusting device configured to adjust a pressure applied to the overlapping surface by the anvil and the horn according to a value of the thickness of the electrode tab measured by the electrode tab measuring part.

2. The ultrasonic welding device of claim 1, wherein the pressure adjusting device comprises a horn pressure adjusting part, wherein the pressure adjusting device is configured to allow pressing force of the horn applied to the overlapping surface to increase or decrease according to the thickness value of the electrode tab, which is measured by the electrode tab measuring part, so that the pressure applied to the overlapping surface by the anvil and the horn is adjustable.

3. The ultrasonic welding device of claim 2, wherein the horn pressure adjusting part comprises:
   a horn control piece configured to calculate a pressure value of the horn by comparing the thickness value measured by the electrode tab measuring part to a predetermined set thickness reference value of the electrode tab; and a horn pressure adjusting piece configured to allow the pressing force of the horn applied to the overlapping surface to increase or decrease according to the pressure value of the horn, wherein the pressure value is calculated by the horn control piece.

4. The ultrasonic welding device of claim 3, wherein the horn pressure adjusting piece is configured to allow the horn to ascend or descend in a direction of the overlapping surface so as to adjust the pressure of the horn through a distance between the overlapping surface and the horn.

5. The ultrasonic welding device of claim 3, wherein three or more electrode tab measuring parts are installed on the electrode tab disposed on the overlapping surface to measure thicknesses at three or more positions, and the horn control piece is configured to set an average of the three or more thickness values of the electrode tabs as a thickness value of the electrode tab, wherein the three or more thickness values are measured by the electrode tab measuring parts.

6. The ultrasonic welding device of claim 1, further comprising an electrode lead measuring part configured to measure a thickness of the electrode lead disposed on the overlapping surface, wherein the horn pressure adjusting part is configured to allow the pressing force of the horn applied to the overlapping surface to increase or decrease according to the thickness value of the electrode lead so that the pressure applied to the overlapping surface by the anvil and the horn, again is adjustable, wherein the thickness value is measured by the electrode lead measuring part.

7. The ultrasonic welding device of claim 1, wherein the pressure adjusting device comprises an anvil pressure adjusting part configured to allow pressing force of the anvil applied to the overlapping surface to increase or decrease according to the thickness value of the electrode tab so that the pressure applied to the overlapping surface by the anvil and the horn is adjustable, wherein the thickness value of the electrode tab is measured by the electrode tab measuring part.

8. The ultrasonic welding device of claim 7, wherein the anvil pressure adjusting part comprises:

an anvil control piece configured to calculate a pressure value of the anvil by comparing the thickness value to a predetermined set thickness reference value of the electrode tab, wherein the thickness value is measured by the electrode tab measuring part; and an anvil pressure adjusting piece configured to allow the pressing force of the anvil applied to the overlapping surface to increase or decrease according to the pressure value of the anvil, wherein the pressing force of the anvil is calculated by the anvil control piece.

9. The ultrasonic welding device of claim 8, wherein the anvil pressure adjusting piece is configured to allow the horn to ascend or descend in a direction of the overlapping surface so as to adjust the pressure of the anvil through a distance between the overlapping surface and the anvil.

10. The ultrasonic welding device of claim 2, further comprising a height adjusting part configured to constantly maintain a height of the overlapping surface disposed between the anvil and the horn.

11. The ultrasonic welding device of claim 1, further comprising a disposing member disposed in a position so that the electrode tab and the electrode lead, overlap each other, wherein the electrode tab and the electrode lead are provided in the electrode assembly.

* * * * *